No. 726,652. PATENTED APR. 28, 1903.
E. DIMANT.
SOLE FOR BOOTS OR SHOES.
APPLICATION FILED OCT. 7, 1902.
NO MODEL.
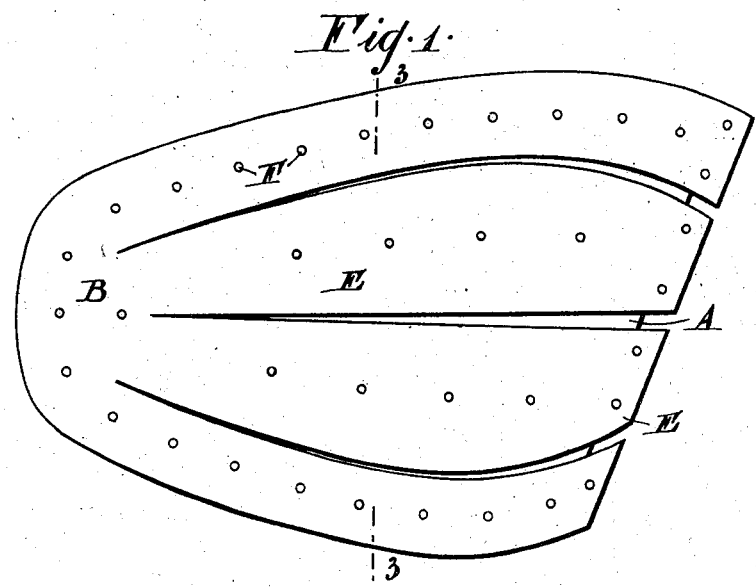
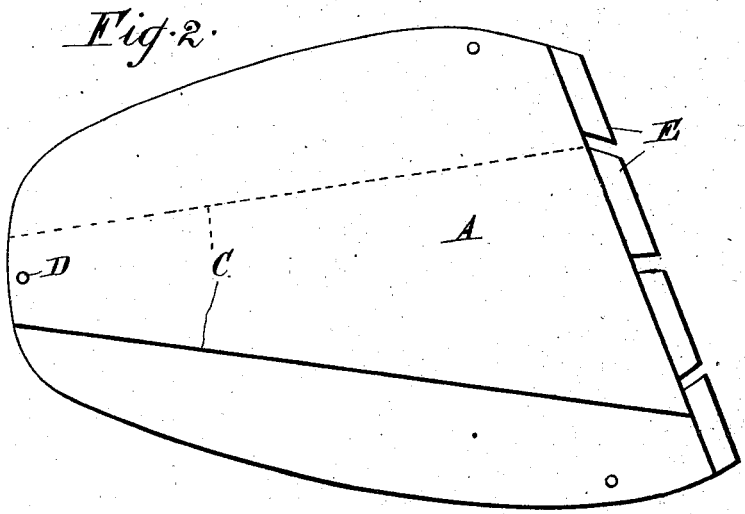
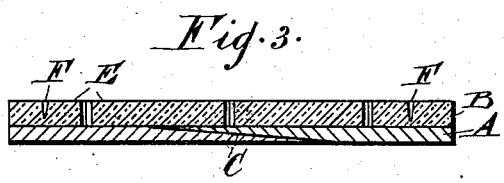
Witnesses
William H. Waters.
Walter C. Hart
Inventor
Elias Dimant
by Edw. Waters + Son.
Attorneys

UNITED STATES PATENT OFFICE.

ELIAS DIMANT, OF MELBOURNE, VICTORIA, AUSTRALIA.

SOLE FOR BOOTS OR SHOES.

SPECIFICATION forming part of Letters Patent No. 726,652, dated April 28, 1903.

Application filed October 7, 1902. Serial No. 126,322. (No model.)

*To all whom it may concern:*

Be it known that I, ELIAS DIMANT, warehouseman, a subject of the King of Great Britain, residing at Equitable Buildings, Collins street, Melbourne, in the State of Victoria and Commonwealth of Australia, have invented an Improved Divided Tread or Sole for Boots or Shoes, of which the following is a specification.

This invention consists in an improved divided tread or sole for boots and shoes which is especially intended for repairing worn soles, inasmuch as any holes previously worn (generally about the center) will be covered over and the ingress of water or damp prevented, while said repairs may readily be effected by inexperienced hands.

Referring to the drawings, Figure 1 is an outside plan, and Fig. 2 an inside plan, of the improved divided tread or sole; and Fig. 3, a transverse section on line 3 3 of Fig. 1.

This improved tread or sole consists generally of two layers A and B, the upper or inner one, A, of which has an approximately longitudinal slit C therethrough, dividing same for the whole or nearly all of its length, the slit itself being inclined in cross-section, so that the two meeting edges may conveniently overlap, as shown in dotted lines, Fig. 2, and a pin D being provided at the toe end to prevent the pieces from parting. If preferred, the layer A may be made from two separate pieces overlapping as before.

The bottom or wearing layer B has two or more longitudinal cuts E therethrough and small nail-holes F and is attached to the upper or inner layer B by nails or otherwise, and the whole compound tread or sole is nailed or pegged to the worn sole of the boot or shoe. This construction allows of ready application to different breadths of soles by reason of the play allowed by the cuts in the lower layer and the slantingly-cut slit in the inner layer, the overlapping edges of which latter serve to cover any hole previously worn in the ordinary boot-sole.

The inner layer A is by preference made lighter than the outer or wearing layer.

In certain cases where only light or auxiliary treads are required or for the treads of heels the inner layer may be dispensed with and the outer divided layer or tread applied as before.

Having now particularly described and ascertained the nature of my said invention and in what manner the same is to be performed, I declare that what I claim is—

1. An improved divided tread or sole for boots or shoes made up of two layers, the inner layer having a cut or slit extending at an inclination from one face to the other face thereof, and the outer layer having a plurality of cuts or slits extending inwardly from the edge thereof.

2. An improved divided tread or sole for boots or shoes made up of two layers, the inner layer having a cut or slit extending at an inclination from one face to the other face thereof, the portions of said layer adjacent to said cut or slit overlapping each other, and the outer layer having a plurality of cuts or slits extending inwardly from the edge thereof.

3. A divided tread or sole for boots and shoes made up of two layers, the inner layer being made in two pieces having overlapping edges, and the outer layer being provided with a plurality of cuts or slits extending inwardly from one of the edges thereof, and a nail for holding the two parts of the first-mentioned layer in proper position with respect to one another.

In testimony whereof I have hereunto set my hand in presence of two subscribing witnesses.

ELIAS DIMANT.

Witnesses:
   EDWARD WATERS,
   EDWARD WATERS, Jr.